United States Patent [19]

Kai et al.

[11] Patent Number: 4,772,096
[45] Date of Patent: Sep. 20, 1988

[54] LIGHT-SHADER

[75] Inventors: Yasuaki Kai; Takatoshi Sagawa; Hiroshi Tabata, all of Yokohama, Japan

[73] Assignee: Nissan Motor Company, Limited, Yokohama, Japan

[21] Appl. No.: 768,729

[22] Filed: Aug. 23, 1985

[30] Foreign Application Priority Data

Aug. 24, 1984 [JP] Japan .................................. 59-175101
Aug. 31, 1984 [JP] Japan .................................. 59-180741

[51] Int. Cl.⁴ ............................................. G02B 27/00
[52] U.S. Cl. ............................. 350/276 R; 350/276 SL
[58] Field of Search ................... 350/276 R; 362/330, 362/354, 29, 276 SL

[56] References Cited

U.S. PATENT DOCUMENTS

| | | | |
|---|---|---|---|
| 2,594,081 | 4/1952 | Shlenker | 362/29 |
| 3,288,990 | 11/1966 | Stahlhut | 362/330 |
| 4,342,821 | 8/1982 | Galves et al. | 350/276 SL |

FOREIGN PATENT DOCUMENTS

51-75456  6/1976  Japan .
57-189439 11/1982 Japan .

Primary Examiner—John K. Corbin
Assistant Examiner—Rebecca D. Gass
Attorney, Agent, or Firm—Foley & Lardner, Schwartz, Jeffery, Schwaab, Mack, Blumenthal & Evans

[57] ABSTRACT

An inventive light-shader can prevent reduction of contrast ratio of views in a display, generation of moires and devastion of images in the views. The light-shader is made up of a light-shading film and a light-transmissive substrate plate. The film includes a plurality of opaque walls standing along its thickness and defining corresponding light-transmissive cells. The light-transmissive substrate plate has one surface attached to one surface of the film and the other surface microscopically rugged. The light-shader is applicable to automotive television sets, computer displays, indicative plates of various meters of automotive vehicles, ships and airplanes, and the like.

20 Claims, 10 Drawing Sheets

TRANSMISSIVITY OF ACHROMATIC
TRANSPARENT SUBSTRATE

LIGHT-SHADER

BACKGROUND OF THE INVENTION

1. Field of the Invention

This invention relates to light-shaders and particularly to light-shaders placed in front of the faceplates of television receiving sets or computer displays or to light-shaders used as indicative plates of various warning lamps.

2. Description of the Prior Art

Conventionally, light-shaders are used in order to prevent the deterioration of the contrast in faceplates caused due to the incidence of outer light by regulating the outer lights incident onto faceplates of various displays such as cathode ray tubes of television receiving sets and computer displays, and liquid crystal displays or to prevent the reflection of lights from faceplates onto reflective surfaces of surrounding objects by limiting the diffusion angle of the light from the faceplates within a certain value.

Figure 1:
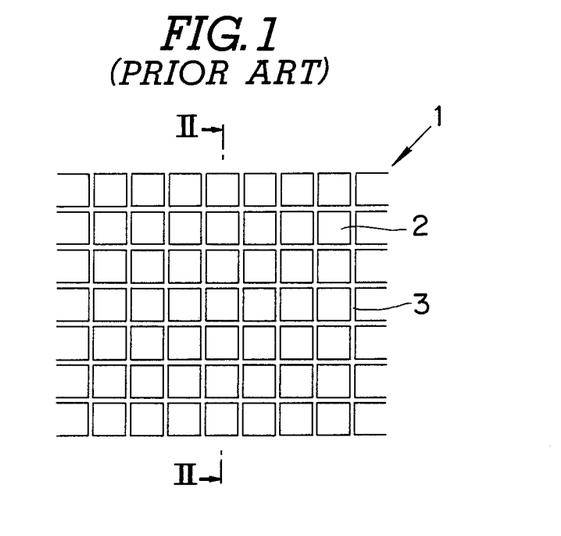
FIG. 1 is an enlarged plan view of a prior art light-shader.
Figure 2:
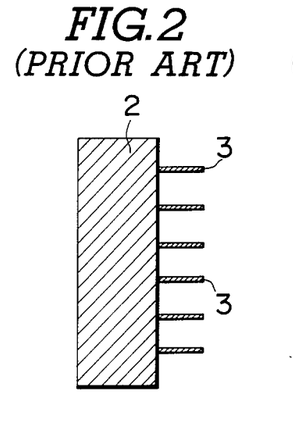
FIG. 2 is a section of the light-shader of FIG. 1 taken along the line II—II.

For example, FIGS. 1 and 2 illustrate a prior art light-shader 1 (See Japanese published unexamined application for patent No. 57-189439). This light-shader 1 comprises a transparent substrate 2 and a light-shading film 3 formed on the substrate 2. The light-shading film 3 is produced by the following steps of applying liquid photosensitive resin containing silica particulates to the substrate 2, transmitting ultraviolet rays onto the resulting continuous layer of the photosensitive resin through a negative film containing a corresponding screening pattern eliminating unexposed parts of the layer of the photosensitive resin, and opaquely coloring only many exposed square walls of the layer of the photosensitive resin to be opaque. The many square opaque walls of the light-shader 3 can regulate outer light falling onto the substrate 2 at relatively large angles.

Figure 3:
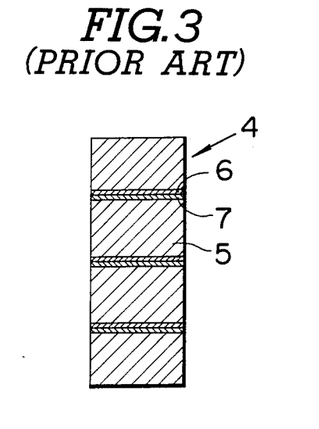
FIG. 3 is a section of another prior art light-shader.

FIG. 3 illustrates another prior art light-shader 4 (See Japanese published unexamined application for patent No. 51-75456). This light-shader 4 comprises transparent thermoplastic resin layers 5, light-diffusive layers 6 and colored opaque adhesive layers 7. This light-shader 4 is produced by the steps of forming a block of a structure corresponding to that of the light-shader 4 and planing the block. The light-diffusive layers 6 and the colored opaque adhesive layers 7 can regulate outer light falling at relatively large angles.

However, the prior art light-shaders 1 and 4 produce many moires in combination with the faceplate and make the outlines of images in the faceplate unclear. If the orientations of the overall opaque parts of the light-shaders 1 and 4 are set at more than certain angles with the orientation of fluorescent substances in the faceplate of the television receiving set in order to prevent the production of moires, then it causes images in the faceplate of the television receiving set to be devastated.

Figure 4:
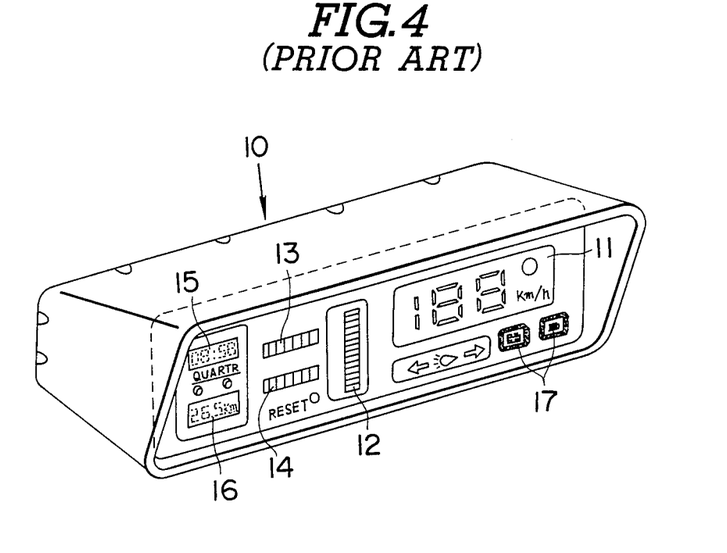
FIG. 4 is a perspective view of an instrument panel using another prior art light-shapder.
Figure 5:
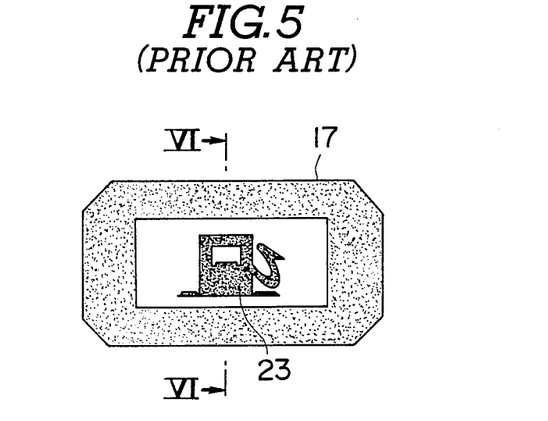
FIG. 5 is an enlarged front view of a warning light of FIG. 4.
Figure 6:
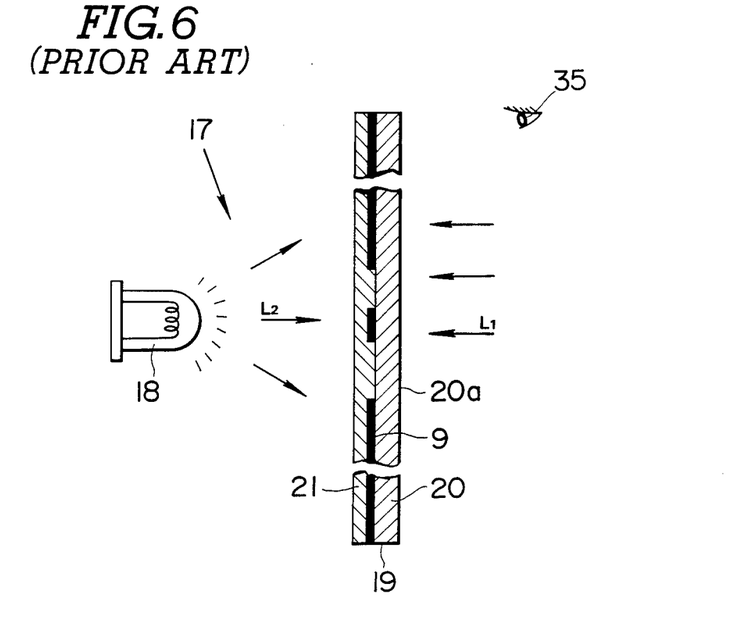
FIG. 6 is an enlarged section of a light-shader of FIG. 5 taken along the line VI—VI.

FIGS. 4 to 6 illustrate an automotive instrument panel using another prior art light-shader. The instrument panel 10 comprises a speedometer 11, a tachometer 12, an odometer 13, a tripmeter 14, a clock 15, a display 16 of a drive computer and warning lights 17. The indicative parts of these devices have essentially the same structure and only the warning light 17 (e.g. as a fuel alarm) is described below.

As shown in FIG. 6, the warning light 17 comprises a light source 18 and an indicative panel 19. This indicative panel 19 comprises a colored translucent polycarbonate panel 20 with a smooth outer surface 20a, a color-pigment layer 21 printed onto an inner surface of the panel 20, a printed indicative layer 22 sandwiched between the color-pigment layer 21 and the panel 20, and a light source 18 facing the color-pigment layer 21. The transmissivity of the panel 20 is 15%. The indicative layer 22 contains a warning symbol 23. When an alarm indicating, e.g. that fuel is low is to be sent out, the light source 18 turns on and thus illuminates the warning symbol 23 by its radiant light $L_2$ in order to warn to a driver 35. In this indicative panel 19, the outer surface 20a of the polycarbonate panel 20 reflects most of outer light $L_1$, thus reducing the contrast ratio of the indicative panel 19 and the visibility of the warning symbol 23. In addition, the indicative layer 22 diffuses the radiant light $L_2$, thus reducing the visibility of the warning symbol 23.

SUMMARY OF THE INVENTION

The present inventors carried out various experiments and researches in order to overcome the generation of moires and the devastation of images on views in displays and discovered that the condition of a surface of a light-transmissive substrate remote from a light-shading film closely affected such generation of moires and devastation of images.

An object of this invention is to provide a light-shader which can prevent reduction of contrast ratio of views in a display, generation of moires and devastation of images on views in the display. In order to achieve this object, the inventive light-shader comprises a light-shading film including a plurality of opaque walls standing along its thickness and defining corresponding light-transmissive cells, a light-transmissive substrate plate having one surface attached to one surface of the light-shading film and having the other surface microscopically rugged.

Since an indicative plate using an inventive light-shader calls for no hood projecting toward a vehicular driver, it will not injure the driver during collision.

DESCRIPTION OF THE PREFERRED EMBODIMENTS

The preferred embodiments of this invention will be described below with reference to FIGS. 7 to 20. In particular, FIGS. 7 to 11 illustrate a light-shader according to a first embodiment of this invention.

First embodiment

Figures 8, 9, 10:
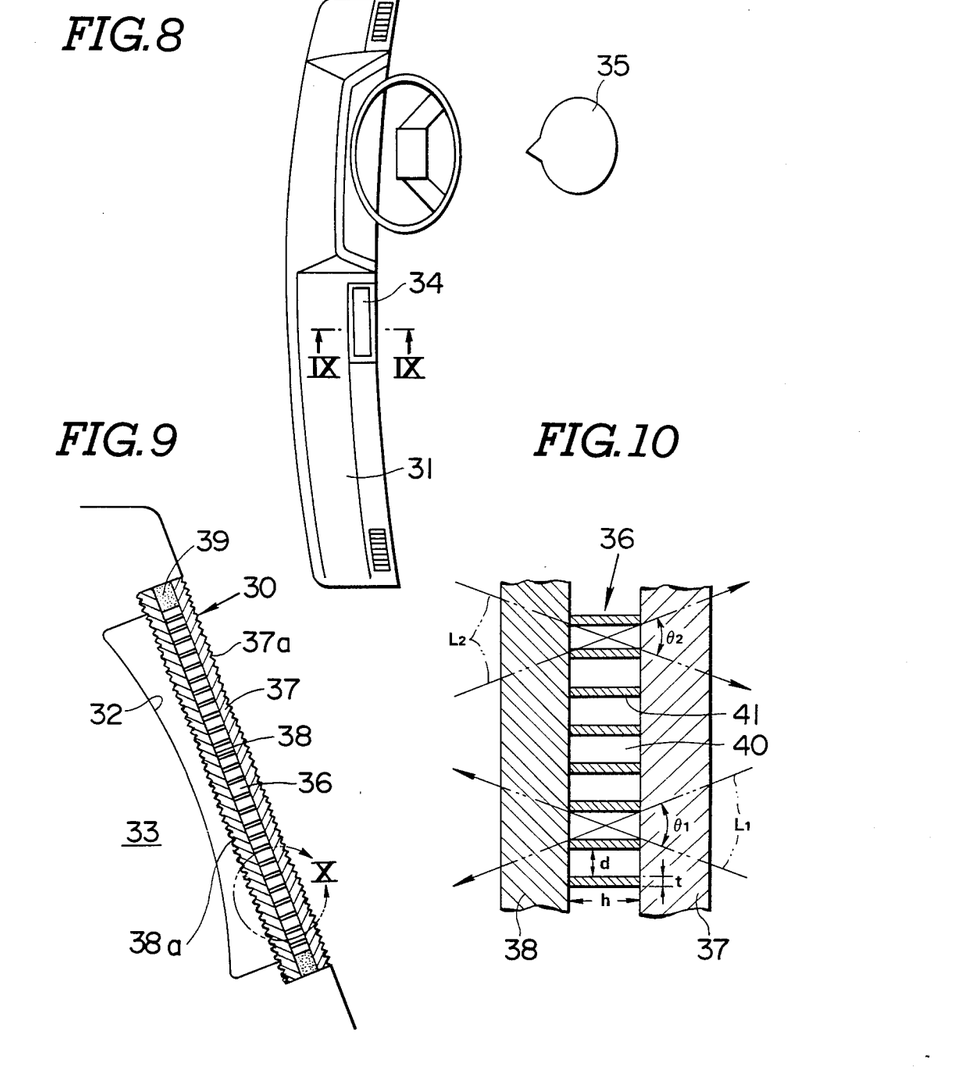
FIG. 8 is a diagrammatic plan view of a vehicular compartment, indicating a mounting location of a vehicular compact television receiving set using the light-shader of FIG. 7.
FIG. 9 is an enlarged section of the light-shader of FIG. 8 taken along the line IX—IX.
FIG. 10 is an enlarged illustration of an encircled portion X of FIG. 9.

As shown in FIG. 9, an automotive instrument panel 31 includes the panel-like light-shader 30 placed 5 mm before in front of a faceplate 32 of a Braun tube 33 of a compact television receiving set 34 disposed at the center of the instrument panel 31. The faceplate 32 of the television receiving set 34 is set at 20° upward angles in order for a driver 35 to easily look at the faceplate 32.

The light-shader 30 regulates not only a maximal limit of an incidence angle $\theta_1$ of the outer light $L_1$ incident onto the faceplate 32 so as to prevent the deterioration in the contrast ratio of the faceplate 32, but also a maximal limit of a diffusion angle $\theta_2$ of the radiant light $L_2$ from the faceplate 32 so as to prevent the reflection of images on the faceplate 32 onto a side-window glass etc.

As shown in FIG. 9, the light-shader 30 comprises a light-shading film 36 being 0.45 mm thick and made from a photosensitive resin composition containing 5 wt% silica particulates with a 7 um average particle size, an outer plate-like transparent substrate 37 in contact with the outer surface of the light-shading film 36, an inner plate-like transparent substrate 38 in contact with the inner surface of the light-shading film 36 and pressure sensitive adhesive double coated tapes 39 being 0.2 mm thick and adhered to the edge of the light-shading film 36 and the inner surfaces of the outer and inner substrates 37 and 38. The outer- and inner substrates 37 and 38 are made of a 0.5 mm thick achromatic polycarbonate plate.

The silica particulates in the light-shading film 36 can prevent letters and images on the faceplate 32 from being blotted. The size of the silica particulates may be preferably 1 to 20 um. The content of the silica particulates may be preferably 3 to 5 wt%.

As a photosensitive resin composition, a liquid hydrophilic one is employed so that unset resin in producing the light-shading film 36 can be easily eliminated and dissolved in alkaline cleaner. The outer- and inner substrates 37 and 38 sandwiching the light-shading film 36, and the tapes 39 can prevent the swelling of the film 36 caused by absorption of moisture in the air and can protect the film 36 from dust in the air.

Figure 7:
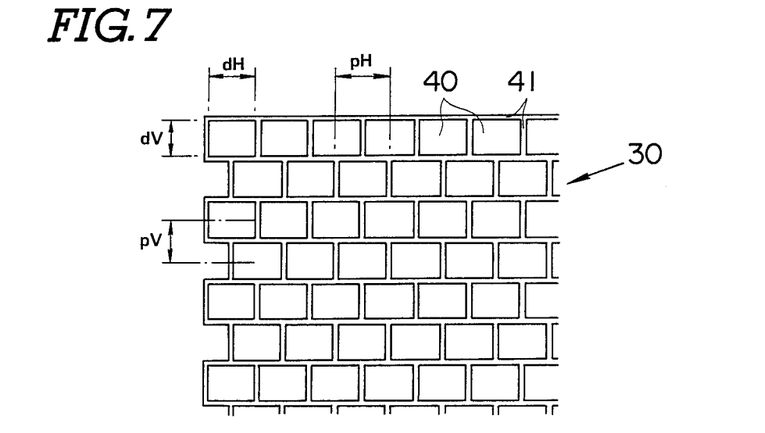
FIG. 7 is an enlarged plan view of a light-shader according to a first embodiment of this invention.

As shown in FIG. 7, the light-shading film 36 has many rectangular opaque walls 41 defining micro-openings or transparent cells 40. The opaque walls 41 are formed by opaquely dyeing a set photosensitive resin by means of, e.g. black dye. On the other hand, the transparent cells 40 are formed by eliminating an unset photosensitive resin by means of alkaline cleaner to form micro-openings. The ratio of the aperture of the cell 40 or the diameter d of the inscribed circle of the cell 40 to the height h of the wall 41 is determined to be $0.23 < d/h < 0.5$ and the ratio of the diameter d of the inscribed circle of the cell 40 to the thickness t of the opaque wall 41 is determined to be $1.2 < d/t < 25$ so that an optimal diffusion angle $\theta$ at which the light from the faceplate 32 will not be reflected onto surrounding reflective surfaces of objects, can be selected to be $24° < \theta < 54°$.

In addition, the vertical diameter dV and the horizontal diameter dH of the cell 40 are determined to be 0.38 nm and 0.50 nm, and the vertical pitch pV and the horizontal pitch pH of the cell 40 are determined to be 0.42 nm and 0.55 nm.

The outer and inner substrates 37 and 38 have microscopically rugged unattached surfaces 37a and 38a opposite the inner surfaces of them in contact with the light-shading film 36.

The generation of moire and the devastation of images on the faceplate 32 is tested on the above-described light-shader 30. Table 1 shows the results of this test.

TABLE 1

|  | Outer transparent substrate | | | Inner transparent substrate | | | Moire | Image Clearness | Reflection of outer scene |
| --- | --- | --- | --- | --- | --- | --- | --- | --- | --- |
|  | G1 (%) | G2 (%) | Ra (μm) | G1 (%) | G2 (%) | Ra (μm) |  |  |  |
| Example 1 | 93.1 | 72.7 | 0.25 | 81.8 | 48.1 | 0.38 | none | good | low |
| Example 2 | 93.1 | 72.7 | 0.25 | Untreated smooth surface | | | none | good | low |
| Example 3 | 59.0 | 46.0 | 0.47 | Untreated smooth surface | | | none | good | low |
| Control 1 | 93.1 | 72.7 | 0.25 | 77.6 | 46.0 | 0.47 | none | Outlines are unclear | low |
| Control 2 | 97.2 | 75.9 | 0.18 | Untreated smooth surface | | | Concentric circular moires | Black stripes are produced | high |
| Control 3 | 52.9 | 41.3 | 0.52 | Untreated smooth surface | | | none | Outlines are unclear | low |
| Control 4 | Untreated smooth surface | | | Untreated smooth surface | | | Many concentric circular moires | Many black stripes are produced | high |

In these tests, light-shaders 30 are illuminated at 500 lux in a dark room and views of the faceplate 32 are tested. 60-degree-specular glossiness G1 (according to JISK5400-1979, 6.7), relative glossiness G2 and center line average height Ra (according to JISB0601-1982) are employed as criteria for evaluating degree of the ruggedness of the unattached surfaces 37a and 38a.

Figure 11:
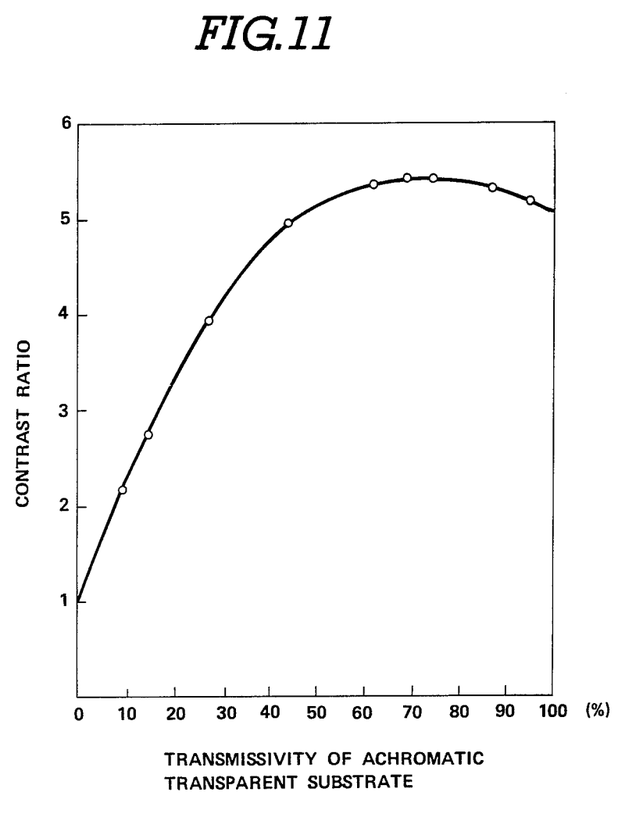
FIG. 11 is a graph representing a relationship between the transmissivity of achromataic transparent substrate and contrast ratio.

Relative glossiness G2 represents a percentage of the ratio of the 60-degree-specular glossiness G1 of a rugged surface to the 60-degree-specular glossiness G1 of an untreated smooth surface and can best evaluate the ruggedness of a surface. The untreated smooth surface includes no ruggedness. The 60-degree-specular glossiness G1 of the untreated and smooth unattached surface 37a of the outer substrate 37 is 128.1%. The relative glossiness G2 thereof is 100%. The center line average height Ra thereof is 0.05 μm. The 60-degree-specular glossiness G1 of the untreated smooth surface of the inner substrate 38 is 168.5%. The relative glossiness G2 thereof is 100%. The center line average height Ra thereof is 0.05 μm. The specular glossiness of microscopically rugged surfaces were determined by means of a Suga tester color computer (a SM-2 type). An achromatic polycarbonate plate for the outer substrate 37 exhibits a transmissivity and reflectivity being substantially equal over the range of visible light of 400 to 700 nm in order to protect the tone of the faceplate 32. FIG. 11 shows the contrast ratio of views in the faceplate 32 when the light-shader 30 is placed in front of the faceplate 32. The contrast ratio is expressed as the following equation:

$$C = \frac{B}{R - L/\pi} - 1$$

where B represents effective luminance (cd/cm$^2$), R represents reflectivity and L represents illuminance of incident light. As shown in FIG. 11, this contrast ratio exhibits a local maximum near 70% of the transmissivity of an achromatic transparent polycarbonate plate. It is because the reflectivity of this polycarbonate plate quadratically increases with the increase of the transmissivity of this polycarbonate plate. Thus, an achromatic transparent polycarbonate plate with a 70.7% transmissivity was employed. If the transmissivity of the outer substrate 37 is above 85%, the faceplate 32 is too glaring. On the other hand, if it is under 50%, the faceplate 32 lacks in sufficient lightness. Therefore, an achromatic transparent polycarbonate plate with a transmissivity from 50 to 85% may be employed as a material for the outer substrate 37.

A highly transmissive and achromatic transparent material is employed for the inner substrate 38 so as not to reduce the transmissivity of the light-shader 30.

Table 1 shows that Example 1 of the first embodiment having the rugged unattached surface 37a with a 72.7% relative glossiness G2 and the rugged unattached surface 38a with a 48.1% relative glossiness G2, Example 2 of the first embodiment having the same rugged unattached surface 37a as Example 1 and the untreated smooth unattached surface 38a, and Example 3 of the first embodiment having the rugged unattached surface 37a with a 46.0% relative glossiness G2 and the same unattached surface 38a as Example 2, did not produced any moires. It was found that Examples having the rugged unattached surfaces 37a with a relative glossiness G2 of 46 to 72.7% did not produce any moires irrespective of the condition of the unattached surface 38a.

Table 1 also shows that Control 4 having the untreated and smooth unattached surfaces 37a and 38a, produced many concentric circular moires and that Control 2 having the smooth unattached surface 38a and the rugged unattached surface 37a with a 75.9% relative glossiness, being the greatest, produced concentric circular moires.

On the other hand, Table 1 shows that Control 3 having the untreated and smooth unattached surface 38a and the rugged unattached surface 37a, did not produce any moires. It is because the outer substrate 37 has the more microscopically rugged unattached surface 37a with a 41.3% relative glossiness. Thus, it is found that even if the unattached surface 38a is untreated and smooth, the light-shader 30 can prevent the generation of moires when the unattached surface 37a is certainly microscopically rugged.

Consequently, when the relative glossiness G2 of the unattached surfaces 37a and 38a increase and the center line average heights Ra of the unattached surfaces 37a and 38a are reduced, moires and black stripes are still remained and the reflection of outer scenes onto the unattached surfaces 37a and 38a increases. On the other hand, when the relative glossiness G2 of the unattached surfaces 37a and 38a are excessively reduced and the center line average heights Ra of the unattached surfaces 37a and 38a excessively increase, the outlines of the images on the faceplate 32 are blotted and obscured and the diffusion-angle-of-outer-light-regulating capacity of the light-shader 30 is reduced.

Since Table 1 shows that the microscopically rugged unattached surface 37a can effectively prevent the generation of moires and the devastation of images on the faceplate 32 rather than the microscopically rugged unattached surface 38a, at least the unattached surface 37a must be microscopically rugged when clear images are called for on the faceplate 32.

The above-described tests established that the relative glossiness G2 and the center line average height Ra of the unattached surface 37a were preferably from 45 to 73% and from 0.2 to 0.5 μm, respectively and that those of the unattached surface 38a were preferably from 48 to 100% (=G2) and from 0.05 to 0.4 μ(=RA), respectively. The tests also established that the 60-degree-specular-glossiness G1 of the unattached surface 37a was preferably from 40 to 120% when the unattached surface 38a was untreated and smooth and that the 60-degree-specular-glossinesses G1 of the the unattached surfaces 37a and 38a were preferably from 50 to 110% when both of the unattached surfaces 37a and 38a were microscopically rugged.

Second embodiment

FIGS. 12 to 15 illustrate a panel-like light-shader 45 according to a second embodiment of this invention which is used as an indicative plate of an automotive warning light, e.g. fuel alarm.

Figure 12:
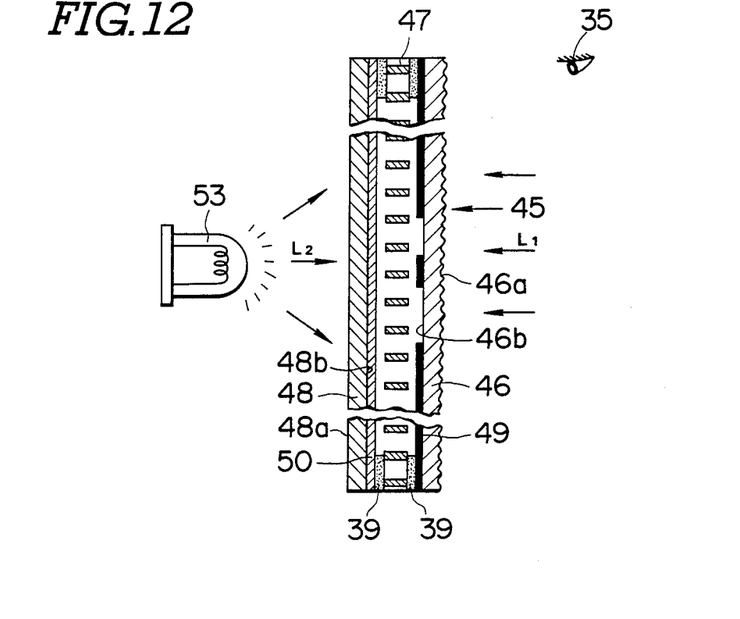
FIG. 12 is a diagrammatic section of a light-shader according to a second embodiment of this invention.

As shown in FIG. 12, the light-shader 45 comprises an outer plate-like transparent substrate 46, a light-shading film 47 and an inner plate-like transparent substrate 48. The outer substrate 46 is made of a 0.5 mm thick transparent tint polycarbonate plate with a 58.3% transmissivity. The outer substrate 46 has a microscopically rugged unattached surface 46a and an indicative layer 49 adhered to its inner surface 46b. The indicative layer 49 contains a printed symbol indicating a particular alarm. The inner substrate 48 is made of the same transparent achromatic polycarbonate plate as the outer substrate 37 in the first Example. This polycarbonate plate will not reduce the appearance transmissivity of the light-shader 45.

The outer unattached surface 48a of the inner substrate 48 is untreated and smooth. The inner surface 48b of the inner substrate 48 has a printed translucent layer 50 containing a color pigment.

The light-shading film 47 is sandwiched between the outer- and inner substrates 46 and 48 and adhered to the inner surfaces 46b and 48b by means of pressure sensitive adhesive double contact tapes 39 disposed at the edges of both the surfaces of the light-shading film 47. The light-shading film 47 which is made from liquid urethane photosensitive resin, is 0.7 mm thick and exhibits a 69.8% transmissivity.

Figure 13:
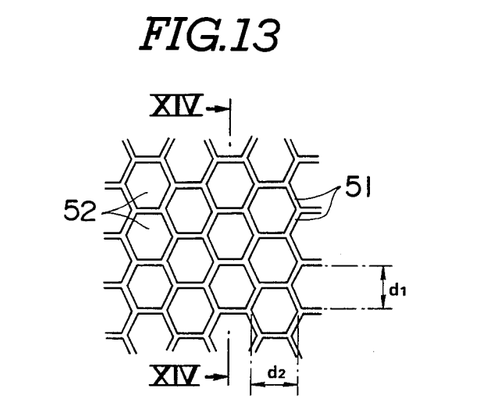
FIG. 13 is a plane view of a light-shading film of FIG. 12.
Figure 14:
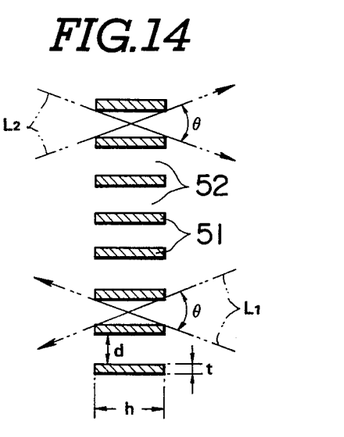
FIG. 14 is a diagrammatic section of the light-shading film taking along the line XIV—XIV.

As shown in FIG. 13, the light-shading film 47 is the same as the light-shading film 36 except that it has a honeycomb structure containing many hexagonal opaque walls 51 defining micro-openings or transparent cells 52. The length d2 of a major axis of the cell 52 is 315 μm and the length d1 of a minor axis of the cell 52 is 270 μm. The height h of the wall 51 is 700 μm. The thickness t of the wall 51 is 50 μm. The incidence or radiation angle θ of incident light L₁ or radiant light L₂ is theoretically selected to be about 42°. The ratio of the aperture of the cell 2 or the diameter d of the inscribed circle of the cell 52 to the height h of the wall 51 is equal to that in the first Example. The ratio of the diameter d of the inscribed circle of the cell 52 to the thickness t of the wall 51 is also equal to that in the first Example.

The polycarbonate plate for the outer substrate 46 exhibits a transmissivity and reflectivity being substantially equal over the range of visible light of 400 to 700 nm in order to protect the tone of a light source 53.

Figure 15:
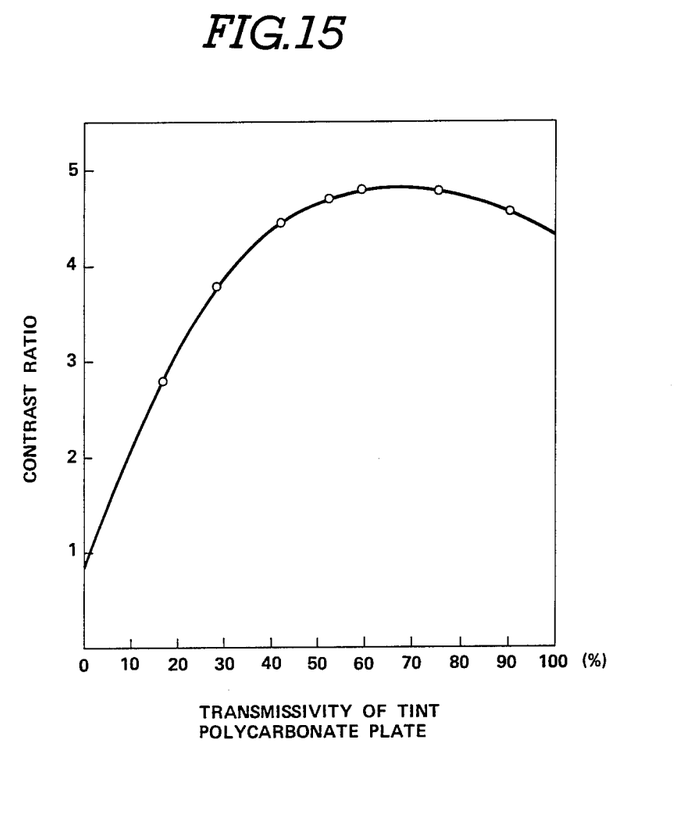
FIG. 15 is a graph representing a relationship between the transmissivity of tint transparent polycarbonate panel and contrast ratio.

As shown in FIG. 15, the contrast ratio of the light-shader 45 exhibits a local maximum near 60% of the transmissivity of a tint transparent polycarbonate plate, so that a tint transparent polycarbonate plate with a 58.3% transmissivity was employed.

The views of the warning symbol in the indicative layer 49 taken from the driver 35 were tested on the light-shader 45 of the fourth Example with various degrees of ruggedness on the unattached surface 46a. The degree of reflection of the warning symbol in the indicative layer 49 onto a front window glass and side window glasses is tested in order to test the incidence and radiation angle regulating function of the light-shading film 47. For example, that reflection of the warning symbol in the indicative layer 49 means that the light-shading film 47 fails to regulate the diffusion angle θ of radiant light L₂ from the light source 53.

Table 2 shows the results of these tests.

TABLE 2

| | G1 (%) | G2 (%) | Ra (μm) | Reflection toward outside | Specular Reflection |
| --- | --- | --- | --- | --- | --- |
| Example 4 | 49.0 | 41.3 | 0.52 | none | low |
| Example 5 | 35.5 | 29.9 | 0.70 | none | low |
| Example 6 | 59.8 | 50.4 | 0.42 | none | low |
| Example 7 | 74.2 | 62.5 | 0.28 | none | low |
| Control 5 | 84.0 | 70.8 | 0.18 | none | Somewhat high |
| Control 6 | 28.3 | 23.8 | 0.83 | Some onto side window glass | low |
| Control 7 | 11.7 | 9.8 | 1.20 | Some onto front and side window glasses | low |

In Examples 4 to 7 of the second embodiment, the front window glass and the side window glasses did not reflect the warning symbol in the indicative layer 49 and the unattached surface 46a did not specularly reflect, so that the driver 35 could well recognize the warning symbol in the indicative layer 49.

On the other hand, in Control 5 exhibiting the intently reduced center line average height Ra, the unattached surface 46a is specularly reflective so that the driver 35 could hardly recognize the warning symbol in the indicative layer 49. In Controls 6 and 7 exhibiting the intently reduced 60-degree-specular glossinesses G1 and relative glossinesses G2, the front window glass and the side window glasses reflected the warning symbol in the indicative layer 49. These results mean that the unattached surface 46a and the indicative layer 49 block the incidence-and-radiation-angles-regulating function of the light-shading film 47 and thus cause the radiant light L₂ from the light source 53 to be diffused at wide angle.

These tests also established that the unattached surface 46a preferably exhibited the microscopic ruggedness with a relative glossiness G2 from 25 to 65% and a center line average height Ra from 0.2 to 0.7 μm.

Third embodiment

Figure 16:
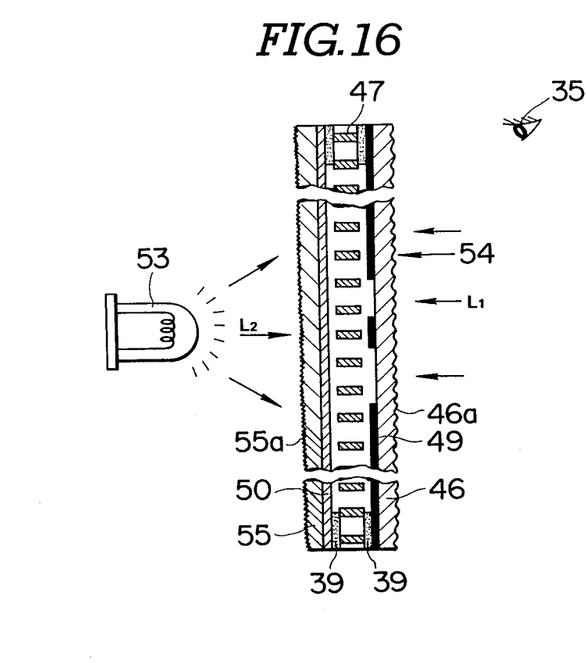
FIG. 16 is a diagrammatic section of a light-shader according to a third embodiment of this invention.

FIG. 16 illustrates a light-shader 54 according to a third embodiment of this invention. The light-shader 54 differs from the light-shader 45 according to Example 4 of the second embodiment in that an unattached surface 55a of an inner substrate 55 is more microscopically rugged than an unattached surface 46a of an outer substrate 46.

The views of the warning symbol in the indicative layer 49 taken from the driver 35 were tested on the light-shader 54. Table 3 shows the results of these tests.

TABLE 3

| | G1 (%) | G2 (%) | Ra (μm) | Uniformity of lightness |
| --- | --- | --- | --- | --- |
| Example 8 | 11.7 | 6.9 | 1.35 | good |
| Example 9 | 28.3 | 16.8 | 0.98 | good |
| Example 10 | 9.2 | 5.5 | 1.45 | good |
| Control 8 | 35.5 | 21.1 | 0.89 | A center can be more illuminated. |
| Control 9 | 59.8 | 35.5 | 0.60 | A center can be more illuminated. |

In Examples 8 to 10 having the very microscopically rugged unattached surface 55a, the overall lightness of the light-shader 54 is uniform so that even the edge of the light-shader 54 is so clear to look at. These tests also establish that the unattached surface 55a preferably exhibited the microscopic ruggedness with a relative glossiness of $5.0 < G2 \leq 18\%$ and a center line average height of $0.95 \leq Ra < 1.50$ μm.

On the other hand, in Controls 8 and 9 having substantially the same rugged unattached surface 55a as the rugged unattached surface 46a, the central area of the indicative layer 49 opposite the light source 54 can be more illuminated.

Fourth embodiment

Figure 17:
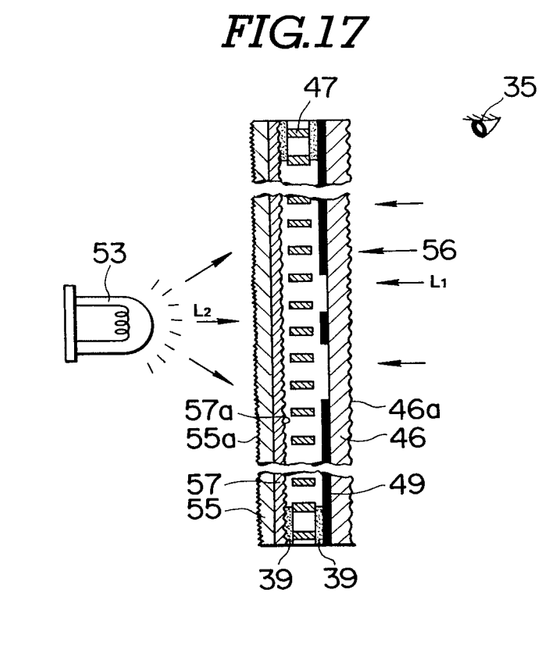
FIG. 17 is a diagrammatic section of a light-shader according to a fourth embodiment of this invention.

FIG. 17 illustrates a light-shader 56 according to a fourth embodiment of this invention. The light-shader 56 differs from the light-shader 54 according to the third embodiment in that one surface 57a of a color-pigment-printed layer 57 facing a light-shading film 47 is microscopically rugged.

The views of the warning symbol in an indicative layer 49 taken from the driver 35 were tested on the light-shader 56. The same tests as carried out on Examples 8 to 10 and Controls 8 and 9 established that the light-shaders 56 according to Examples 8 to 10 did not reflect the warning symbol onto the front window glass and the side window glasses and cause a specular reflection and the unevenness of lightness so that the warning symbol can be well recognized similarly in Examples 8 to 10.

Fifth embodiment

Figure 18:
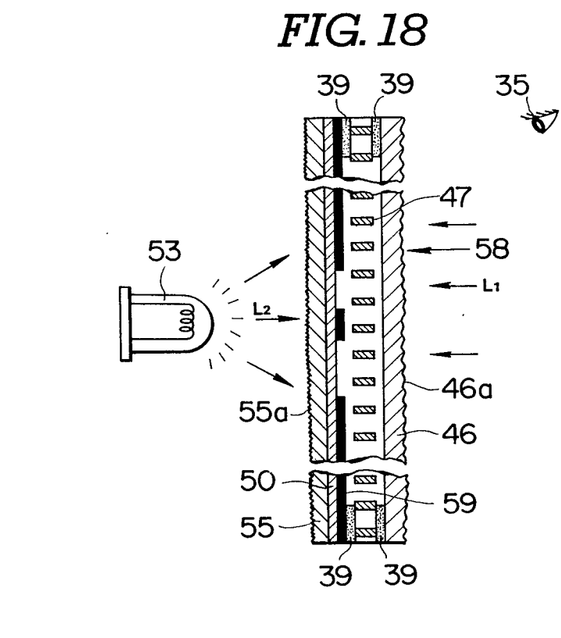
FIG. 18 is a diagrammatic section of a light-shader according to a fifth embodiment of this invention.

FIG. 18 illustrates a light-shader 58 according to the fifth embodiment of this invention. The light-shader 58 differs from the light-shader 54 according to the third embodiment in that an indicative layer 59 containing the warning symbol is formed on a surface of a color-pigment-printed layer 50 but not on the inner surface 46b of an outer substrate 46.

The views of the warning symbol in the indicative layer 59 taken from the driver 35 were tested on the light-shader 58. The same tests as carried out on Examples 8 to 10 and Controls 8 and 9 established that the visibility of the warning symbol in the indicative layer 59 when the light source 53 is lit, is very good similarly in Examples 8 to 10. In addition, the warning symbol can be completely blocked from the eyes of the driver 35 when the light source 53 is put out.

Sixth embodiment

Figure 19:
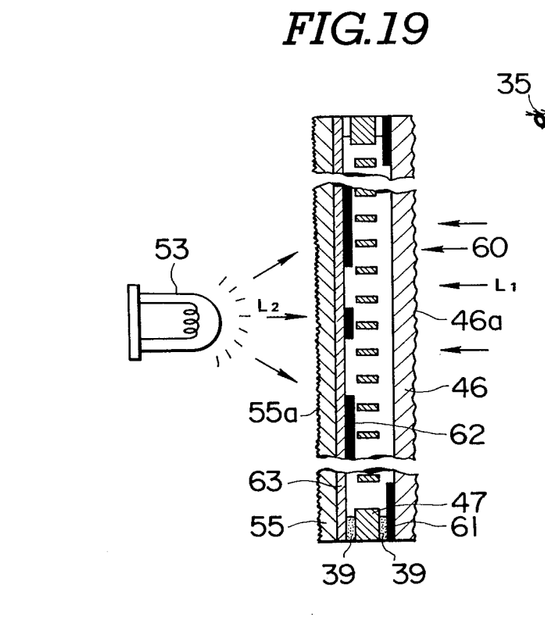
FIG. 19 is a diagrammatic section of a light-shader according to a sixth embodiment of this invention.

FIG. 19 illustrates a light-shader 60 according to the sixth embodiment of this invention. The structure of the light-shader 60 differs from the structure of the light-shader 58 in that a black printed frame 61 is formed on the inner surface 46b of an outer substrate 46 of the light-shader 60 and an indicative layer 62 containing a warning symbol is formed on the surface of a color-pigment-printed layer 63 within the printed frame 61. The color-pigment-printed layer 63 is made from a green fluorescent ink (produced by DAI NIPPON INK CO., LTD.) by the process of screen printing. The thickness of the color-pigment-printed layer 63 is 10 μm. The center line average height Ra of the rugged unattached surface 55a is 1.21 μm. The 60-degree-specular glossiness $G_1$ thereof is 12.5%. The relative glossiness $G_2$ thereof is 7.4%. The indicative layer 62 is made from an ink containing an opaque black pigment. The thickness of the indicative layer 62 is 10 μm. The light-shading film 47 is produced by the following process comprising the steps of: transmitting ultraviolet rays onto liquid photosensitive urethane resin (produced by ASAHI CHEMICAL INDUSTRY CO., LTD.) through a masking negative film so as to set an light-exposed part of the resin, eliminating a light-nonexposed part of the resin by means of 1 wt% aqueous solution of sodium borate and opaquely coloring the resulting set or light-exposed part with a black disperse dye. The light-shading film 47 includes a honeycomb structure shown in FIG. 13. The length d1 of a minor axis of a transparent cell 52 of the light-shading film 47 is 270 μm. The length d2 of a major axis of the cell 52 of the light-shading film 47 is 315 μm. The thickness t of an opaque wall 51 of the light-shading film 47 is 50 μm. The height h of the wall 51 of the light-shading film 47 is 700 μm. With the light-shading film 47, the diffusion angle θ of the radiant light from the light source 53 is horizontally 42° and vertically 48°. The transmissivity of the light-shading film 47 is 69.8%. The light-shading film 47 is attached to the color-pigment-printed layer 63 and to the printed frame 61 by means of pressure sensitive double adhesive tapes 39.

The use of the green polycarbonate ink for the color-pigment-printed layer 63 would not affect the properties of the outer substrate 46 at all but affected the properties of the inner substrate 55. In particular, the same tests of the views of the warning symbol in the indicative layer 62 taken from the driven 35 were carried out as the tests in the third embodiment, so that the preferable relative glossiness $G_2$ of the unattached surface 55a of the sixth embodiment was found to be no more than 15% and the preferable center line average height Ra of the unattached surface 55a was found to be at least 1.1 μm. It seems that the degree of ruggedness of the unattached surface 55a of the sixth embodiment must be higher than those of the unattached surface 55a of the other embodiments since a fluorescent ink is more transmissive than other ink.

Figure 20:
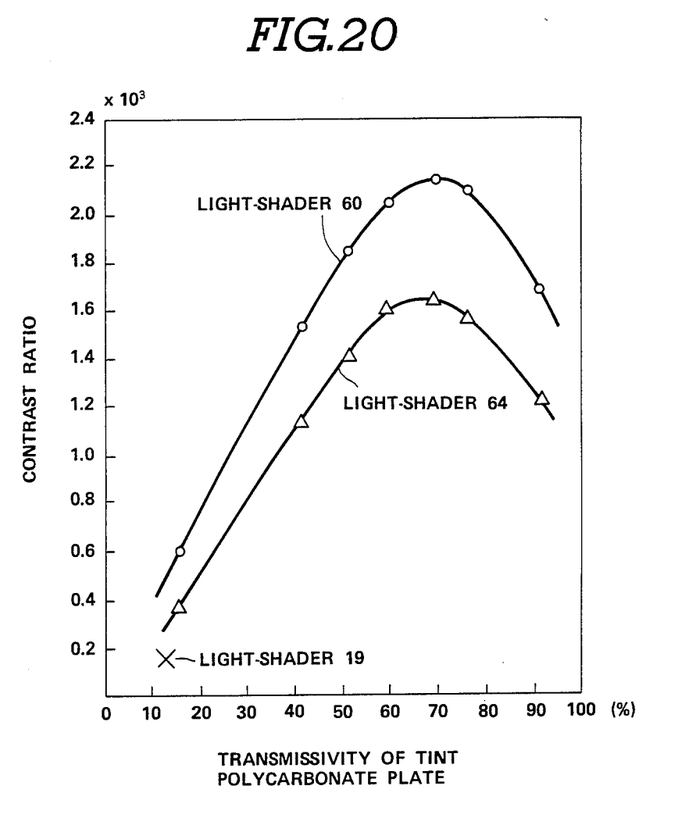
FIG. 20 is a graph representing relationships between the transmissivities of tint transparent polycarbonate panels and contrast ratios.

FIG. 20 shows the measured results of contrast ratios of a prior art light-shader 19 of FIG. 6, the light-shader 60 of FIG. 19 and a light-shader 64 of a control which differs from the light-shader 60 in that it contains non-fluorescent color ink but not fluorescent color ink. These measurements of contrast ratios were carried out in the manner described below. Light is cast onto an unattached surface of an outer substrate of each of the three light-shaders at 45°. A photometer with a phototube is placed perpendicular to this unattached surface. An incandescent lamp (rated at 3.5 w, 12 v) is positioned separated from the unattached surface of an inner substrate of each of the three light-shaders and 5 mm under from the top of each light-shader. When the incandescent lamp is off and the light is continuously cast, the output voltage of the phototube is $E_1$ and on the other hand, when the incandescent lamp is on and the light is not cast, the output voltage of the phototube is $E_2$. The contrast ratio is expressed as $C = E_2/E_1$. As shown in FIG. 20, the light-shader 60 of FIG. 19 exhibited the heighest contrast ratio. The light-shader 60 was used as an indicative plate of an automotive warning light. When the light source 53 was put on or off under a direct incidence of sunshine duing a day, the on- or off state of the light source 53 could be easily recognized, so that no awning was required for the light-shader 60 at all.

This invention is also applicable to liquid crystal indicative layers of automotive speedometers, tachometers, odometers and tripmeters. This invention is further applicable to various indicative plates of airplane- or ship instruments or audio- or measure apparatuses.

What is claimed is:
1. A light-shader, comprising:
   a light-shading film including a plurality of opaque walls standing along the thickness of said light-shading film, the opaque walls defining corresponding micro-openings;

a first light-transmissive substrate plate having one surface in contact with one surface of said light-shading film;

an opposite surface of said first light-transmissive substrate plate being remote from said light-shading film and microscopically rugged;

a second light-transmissive substrate plate having one surface in contact with the other surface of said light-shading film; and means for sealing said light-shading film between said first and second light-transmissive substrate, said sealing means being disposed around the edge of said light-shading film.

2. A light-shader as recited in claim 1, further comprising:

an opposite surface of said second light-transmissive substrate plate being remote from said light-shading film and microscopically rugged.

3. A light-shader as recited in claim 2, wherein the relative glossiness of said opposite surface of said first light-transmissive substrate plate is from 45 to 73% and the center line average height of said opposite surface of said first light-transmissive substrate plate is between 0.2 to 0.5 μm and wherein the relative glossiness of said opposite surface of said second light-transmissive substrate plate is from 48 to 100% and the center line average height of said opposite surface of said second light-transmissive substrate plate is 0.05 to 0.4 μm.

4. A light-shader as recited in claim 3, wherein the 60-degree-specular glossiness of both said opposite surfaces of said first- and second light-transmissive substrate plate is from 50 to 110%.

5. A light-shader as recited in claim 2, further comprising:

a translucent color-pigment layer formed on the one surface of said second light-transmissive substrate plate;

an indicative layer formed on a surface of said translucent color-pigment layer opposed to the other surface of said light-shading film; and an opposite surface of said second light-transmissive substrate plate being remote from said light-shading film and more microscopically rugged than said opposite surface of said first light-transmissive substrate plate.

6. A light-shader as recited in claim 5, wherein said translucent color-pigment layer is made of a printed fluorescent ink.

7. A light-shader as recited in claim 6, further comprising:

a second indicative layer disposed between the one surface of said light-shading film and the one surface of said first light-transmissive substrate plate.

8. A light-shader as recited in claim 1, further comprising:

an indicative layer disposed between the one surface of said first light-shading film and the one surface of said light-transmissive substrate plate.

9. A light-shader as recited in claim 1, wherein said first light-transmissive substrate plate is made of an achromatic transparent material with a transmissivity and reflectivity being essentially equal over the wavelengths of 400 to 700 nm of visible light.

10. A light-shader as recited in claim 9, wherein the achromatic transparent material is polycarbonate.

11. A light-shader as recited in claim 9, wherein the transmissivity is about 70%.

12. A light-shader as recited in claim 1, wherein the transmissivity of said second light-transmissive substrate plate is from 50 to 85%.

13. A light-shader as recited in claim 1, wherein the relative glossiness of said opposite surface of said first light-transmissive substrate plate is from 45 to 73% and the center line average height of said opposite surface of said first light-transmissive substrate plate is from 0.2 to 0.5 μm.

14. A light-shader as recited in claim 13, wherein the 60-degree-specular glossiness of said opposite surface of said first light-transmissive substrate plate is from 40 to 120%.

15. A light-shader as recited in claim 1, further comprising:

an indicative layer disposed between the one surface of said light-shading film and the one surface of said first light-transmissive substrate plate; and a translucent color-pigment layer disposed between the one surface of said second light-transmissive substrate plate and the other surface of said light-shading film; and wherein said first light-transmissive substrate plate is made of a tint translucent material and said second light-transmissive substrate plate is made of an achromatic transparent material.

16. A light-shader as recited in claim 14, further comprising:

an opposite surface of said second light-transmissive substrate plate being remote from said light-shading film and more microscopically rugged than said opposite surface of said first light-transmissive substrate plate.

17. A light-shader as recited in claim 16, further comprising:

a microscopically rugged surface of said light-transmissive color-pigment layer opposed to the other surface of said light-shading film.

18. A light-shading system, comprising:

a light-shading film covering a view in a display and including a plurality of opaque walls standing along the thickness of said light-shading film, the opaque walls defining corresponding micro-openings;

a first light-transmissive substrate plate having one surface in contact with a surface of said light-shading film remote from the view;

an opposite surface of said light-transmissive substrate plate being remote from said light-shading film and microscopically rugged, said opposite surface being exposed to incident light;

a second light-transmissive substrate plate having one surface in contact with the other surface of said light-shading film; and means for sealing said light-shading film between said first and second light-transmissive substrate, said sealing means being disposed around the edge of said light-shading film.

19. A light-shading system, comprising:

a light-shading film including a plurality of opaque walls standing along the thickness thereof, the opaque walls defining corresponding hollow cells;

a first light-transmissive substrate plate having one surface in contact with one surface of said light-shading film;

an opposite surface of said light-transmissive substrate plate being remote from said light-shading film and microscopically rugged, said opposite surface being exposed to incident light;

a second light-transmissive substrate plate having one surface in contact with the other surface of said light-shading film and the other surface exposed to radiant light from a light source;

means for sealing said light-shading film between said first and second light-transmissive substrate, said sealing means being disposed around the edge of said light-shading film; and an indicative layer disposed between the one surface of said light-shading film and the one surface of said first light-transmissive substrate plate.

20. A light-shader, comprising:

a light-shading film made from a liquid hydrophilic photosensitive resin and including a plurality of opaque walls standing along the thickness of said light-shading film, the opaque walls defining corresponding hollow cells;

a first light-transmissive substrate plate having one surface in contact with one surface of said light-shading film;

an opposite surface of said first light-transmissive substrate plate being remote from said light-shading film and microscopically rugged;

a second light-transmissive substrate plate having one surface in contact with the other surface of said light-shading film; and a pressure adhesive double coated tape for sealing said light-shading film between said first and second light-transmissive substrates, said tape being disposed around the edge of said light-shading film and attached to the one surface of said first light-transmissive substrate plate and the one surface of said second light-transmissive substrate plate.

* * * * *